US012488918B2

(12) United States Patent
Luo et al.

(10) Patent No.: US 12,488,918 B2
(45) Date of Patent: Dec. 2, 2025

(54) NEODYMIUM-IRON-BORON MAGNET MATERIAL, RAW MATERIAL COMPOSITION PREPARATION METHOD, AND APPLICATION

(71) Applicant: FUJIAN GOLDEN DRAGON RARE-EARTH Co., Ltd., Fujian (CN)

(72) Inventors: Ying Luo, Fujian (CN); Jiaying Huang, Fujian (CN); Zongbo Liao, Fujian (CN); Qin Lan, Fujian (CN); Yulin Lin, Fujian (CN); Dawei Shi, Fujian (CN); Juhua Xie, Fujian (CN); Yanqing Long, Fujian (CN)

(73) Assignee: FUJIAN GOLDEN DRAGON RARE-EARTH Co., Ltd., Fujian (CN)

( * ) Notice: Subject to any disclaimer, the term of this patent is extended or adjusted under 35 U.S.C. 154(b) by 494 days.

(21) Appl. No.: 17/785,044

(22) PCT Filed: Feb. 22, 2021

(86) PCT No.: PCT/CN2021/077178

§ 371 (c)(1),
(2) Date: Jun. 13, 2022

(87) PCT Pub. No.: WO2021/169893

PCT Pub. Date: Sep. 2, 2021

(65) Prior Publication Data

US 2023/0035214 A1 Feb. 2, 2023

(30) Foreign Application Priority Data

Feb. 26, 2020 (CN) ......................... 202010121798.0

(51) Int. Cl.
*B22F 9/04* (2006.01)
*B22F 3/10* (2006.01)
*H01F 1/057* (2006.01)

(52) U.S. Cl.
CPC .......... *H01F 1/0577* (2013.01); *B22F 3/1017* (2013.01); *B22F 9/04* (2013.01);
(Continued)

(58) Field of Classification Search
None
See application file for complete search history.

(56) References Cited

U.S. PATENT DOCUMENTS 9,623,482 B2 4/2017 Yu et al.
10,096,412 B2 10/2018 Kato et al.
(Continued)

FOREIGN PATENT DOCUMENTS

CN 103745823 A 4/2014
CN 104078176 A 10/2014
(Continued)

OTHER PUBLICATIONS

English translation of CN 111261355 (originally published Jun. 9, 2020), obtained from PE2E search.*
(Continued)

*Primary Examiner* — George Wyszomierski
(74) *Attorney, Agent, or Firm* — Houston Beshining Law Office PLLC; Liangang Ye

(57) ABSTRACT

Provided are a neodymium-iron-boron magnet material, raw material composition, preparation method, and application. The raw material composition of the neodymium-iron-boron magnet material comprises the following mass content components: R: 28-33%; R is a rare earth element, R comprises R1 and R2; R1 is a rare earth element added during smelting, and R1 comprises Nd and Dy; R2 is a rare earth element added during grain boundary diffusion, R2 comprises Tb, the content of R2 is 0.2%-1%; Co: <0.5%, but not 0; M: ≤0.4%, but not 0, and M is one or more of Bi, Sn, Zn, Ga, In, Au, and Pb; Cu: ≤0.15%, but not 0; B: 0.9-1.1%; Fe:
(Continued)

60-70%; the percentage is the mass percentage of the mass of each component to the total mass of the raw material composition. The neodymium-iron-boron magnet material has high remanence, coercivity, and good thermal stability.

15 Claims, 1 Drawing Sheet

(52) U.S. Cl.
CPC ..... *B22F 2009/044* (2013.01); *B22F 2203/11* (2013.01); *B22F 2302/05* (2013.01); *B22F 2303/01* (2013.01)

(56) References Cited

U.S. PATENT DOCUMENTS

| | | | | |
|---|---|---|---|---|
| 10,937,578 | B2 | 3/2021 | Ohashi et al. | |
| 2016/0293307 | A1* | 10/2016 | Hirota | H01F 41/0266 |
| 2018/0090250 | A1* | 3/2018 | Ohashi | H01F 1/0577 |
| 2019/0051434 | A1 | 2/2019 | Zakotnik | |
| 2023/0023534 | A1* | 1/2023 | Luo | H01F 1/0577 |

FOREIGN PATENT DOCUMENTS

| | | | | |
|---|---|---|---|---|
| CN | 107871581 | A | | 4/2018 |
| CN | 111261355 | A | * | 6/2020 |
| CN | 111312461 | A | | 6/2020 |
| IN | 103258633 | A | | 8/2013 |
| WO | WO-2021244321 | A1 | * | 12/2021 |

OTHER PUBLICATIONS

English translation of WO 2021244321 (originaly published Dec. 9, 2021), obtained from PE2E search.*

English translation of Chinese priority application No. 202010121798.0 , filed Feb. 26, 2020.

Apr. 29, 2021 International Search Report issued in International Patent Application No. PCT/CN2021/077178.

Apr. 29, 2021 Written Opinion of the International Searching Authority issued in International Patent Application No. PCT/CN2021/077178.

Chinese priority application No. CN202010121798.0 (not published) , filed Feb. 26, 2020.

* cited by examiner

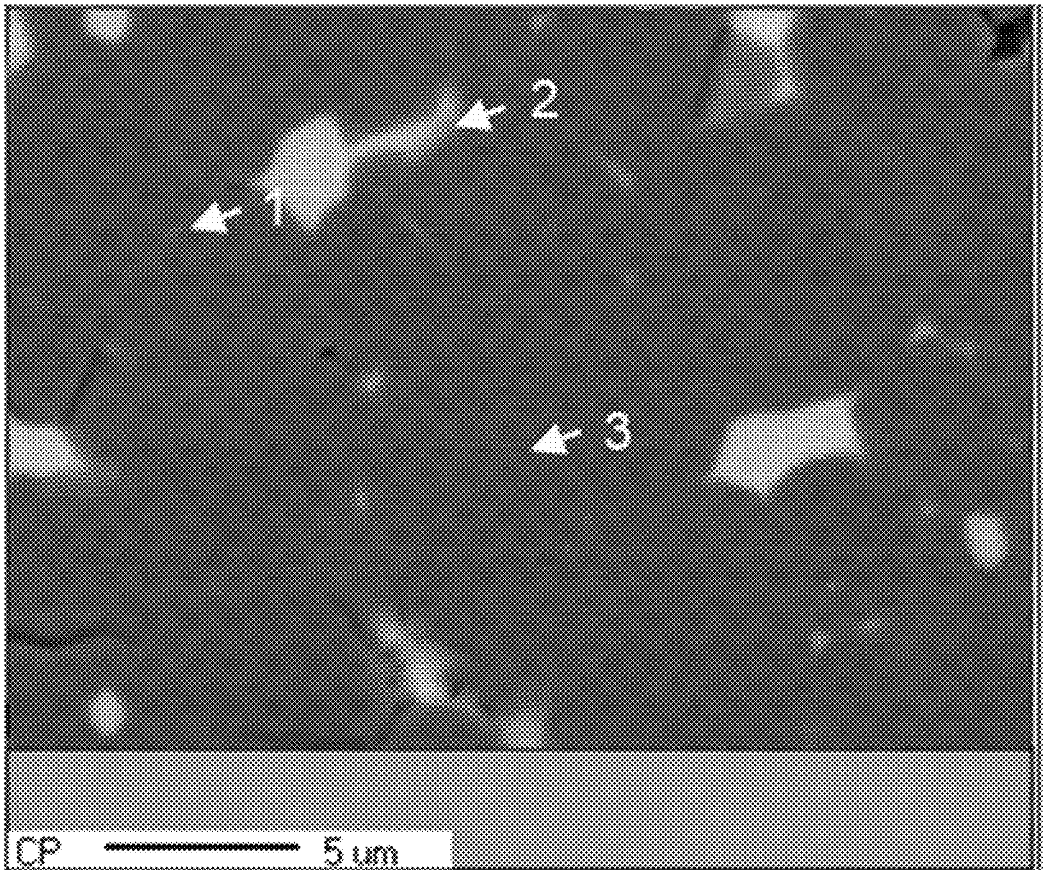
1
2
3
CP
5 um

NEODYMIUM-IRON-BORON MAGNET MATERIAL, RAW MATERIAL COMPOSITION PREPARATION METHOD, AND APPLICATION

The present application is a National Stage of International Application No. PCT/CN2021/077178, filed on Feb. 22, 2021, which claims priority of the Chinese Patent Application No. CN202010121798.0 filed on Feb. 26, 2020, the contents of which are incorporated herein by reference in their entireties.

TECHNICAL FIELD

The present disclosure relates to a neodymium-iron-boron magnet material, a raw material composition, a preparation method, and application.

BACKGROUND

Nd—Fe—B permanent magnet material with the advantages of high magnetic performance, small thermal expansion coefficient, easy processing and low price is based on $Nd_2Fe_{14}B$ compound matrix. Since its appearance, Nd—Fe—B permanent magnet material increased at an average rate of 20-30% per year, and it has been the most widely used permanent magnet material. Classified by preparation method, Nd—Fe—B permanent magnets can be divided into three types: sintering, bonding and heat pressure. Herein, sintering magnets account for 80% or more of the total output, and its use is the most widely.

With the continuous optimization of the preparation process and magnetic component, the maximum magnetic energy product of sintering Nd—Fe—B magnet is close to the theoretical value. With the booming development of emerging industries such as wind power, hybrid vehicles, and inverter air conditioners in recent years, the demand for high-performance Nd—Fe—B magnets has become greater and greater. At the same time, these high-temperature field uses also put forward higher requirements for performance of the magnets, especially the coercivity.

The U.S. patent application U.S. Pat. No. 5,645,651A shows that the curie temperature of Nd—Fe—B magnet increases with the increase of Co content through FIG. 1. In addition, by the comparison of sample 9 and sample 2, table 1 shows that adding 20 at % of Co to the Nd—Fe—B magnet can increase the coercivity while maintaining the remanence unchanged comparing with the solution that does not add Co. Therefore, Co is widely used in high-tech fields such as neodymium-iron-boron rare earth permanent magnets, samarium-cobalt rare earth permanent magnets and battery. But Co is an important strategic resource, and the price is more expensive.

China patent literature CN110571007A has disclosed a rare earth permanent magnet material, which adds 1.5% or more of heavy rare earth element and 0.8% or more of cobalt element meanwhile, and then finally obtained Nd—Fe—B with better coercivity and magnetic properties.

In summary, the neodymium-iron-boron magnet material with better magnetic properties in the prior art needs to add a large amount of heavy rare earth element and cobalt element, which is high cost. A technical solution which can still reach an equivalent or even better level under the premise of adding a small amount of heavy rare earth element or cobalt element needs to be developed.

CONTENT OF THE PRESENT INVENTION

The present invention aims to overcoming the defect that the neodymium-iron-boron magnet material in the prior art needs to add a large amount of cobalt element or heavy rare earth element to improve its magnetic properties (remanence, coercivity, and thermal stability), but the cost is high. Therefore, the present invention provides a neodymium-iron-boron magnet material, raw material composition, preparation method, and application. The neodymium-iron-boron magnet material of the present invention has high remanence, coercivity, and good thermal stability.

The present invention solves the above-mentioned technical problems through the following technical solutions.

The present invention provides a raw material composition of neodymium-iron-boron magnet material, which comprises the following components by mass percentage: R: 28-33%; R is rare earth element, which comprises R1 and R2; R1 is rare earth element added during smelting, which comprises Nd and Dy; R2 is rare earth element added during grain boundary diffusion, which comprises Tb, the content of R2 is 0.2%-1%;

Co: <0.5%, but not 0;

M: ≤0.4%, but not 0, M is one or more of Bi, Sn, Zn, Ga, In, Au, and Pb;

Cu: ≤0.15%, but not 0;

B: 0.9-1.1%;

Fe: 60-70%;

the percentage is the mass percentage of the mass of each component to the total mass of the raw material composition.

In the present invention, the content of R is preferably 29.5-32.6%, for example 29.58%, 29.75%, 29.8%, 30.6%, 30.7%, 30.9%, 30.95%, 31.35% or 32.6%, more preferably 29.5-30.5%, the percentage is the mass percentage to the total mass of the raw material composition. In the present invention, excessive content of the rare earth element will reduce remanence. For example, when the total content of rare earth element is 32.6%, the remanence of the obtained neodymium-iron-boron magnet material will reduce.

In the present invention, the content of Nd in R1 of the raw material composition can be the conventional content in the field, preferably 28.5-32.5%, for example 28.6%, 29.9%, 30.4% or 32.1%, the percentage is the mass percentage to the total mass of the raw material composition.

In the present invention, the content of Dy in R1 is preferably 0.3% or less, for example 0.05%, 0.08%, 0.1%, 0.2% or 0.3%, more preferably 0.05-0.3%, the percentage is the mass percentage to the total mass of the raw material composition.

In the present invention, R1 can further comprises other conventional rare earth elements in the field, for example one or more of Pr, Ho, Tb, Gd, and Y.

Herein, when R1 comprises Pr, the added form of Pr can be conventional form in the field, for example, Pr is added in the form of PrNd, or in the form of a mixture of pure Pr and pure Nd, or in the form of the combination with "a mixture of PrNd, pure Pr and pure Nd". When Pr is added in the form of PrNd, the ratio of Pr to Nd is preferably 25:75 or 20:80; when Pr is added in the form of a mixture of pure Pr and pure Nd, or when Pr is added in the form of the combination with "a mixture of PrNd, pure Pr and pure Nd", the content of Pr is preferably 0.1-2%, for example 0.2%, the percentage is the mass percentage of the mass of each component to the total mass of the raw material composition. Pure Pr or pure Nd described in the present invention generally means that the purity thereof is 99.5% or more.

Herein, when R1 comprises Ho, the content of Ho is preferably 0.1-0.2%, the percentage is the mass percentage to the total mass of the raw material composition.

Herein, when R1 comprises Gd, the content of Gd is preferably 0.1-0.2%, the percentage is the mass percentage to the total mass of the raw material composition.

Herein, when R1 comprises Y, the content of Y is preferably 0.1-0.2%, the percentage is the mass percentage to the total mass of the raw material composition.

In the present invention, the content of R2 is preferably 0.2-0.9%, for example 0.2%, 0.5%, 0.6%, 0.8% or 0.9%, the percentage is the mass percentage to the total mass of the raw material composition.

In the present invention, the content of Tb in R2 is preferably 0.2%-1%, for example 0.2%, 0.6%, 0.8% or 0.9%, more preferably 0.5-1%, the percentage is the mass percentage to the total mass of the raw material composition.

In the present invention, in the raw material composition, R2 preferably further comprises Pr and/or Dy.

Herein, when R2 comprises Pr, the content of Pr is preferably 0.2% or less, but not 0, for example 0.1%, the percentage is the mass percentage to the total mass of the raw material composition.

Herein, when R2 comprises Dy, the content of Dy is preferably 0.3% or less, but not 0, more preferably 0.1-0.2%, for example 0.1%, the percentage is the mass percentage to the total mass of the raw material composition.

In the present invention, the content of Co is preferably 0.05-0.45%, for example 0.05%, 0.1%, 0.2%, 0.3%, 0.4% or 0.45%, more preferably 0.1-0.4%, the percentage is the mass percentage to the total mass of the raw material composition.

In the present invention, the content of M is preferably 0.35% or less, but not 0, more preferably 0.05-0.35%, for example 0.05%, 0.08%, 0.1%, 0.2%, 0.3% or 0.35%, the percentage is the mass percentage to the total mass of the raw material composition.

In the present invention, the kind of M is preferably one or more of Zn, Ga, and Bi.

Herein, when M comprises Ga, the content of Ga is preferably 0.35% or less, but not 0, for example 0.05%, 0.1%, 0.2%, 0.3% or 0.35%, more preferably 0.1-0.35%, the percentage is the mass percentage to the total mass of the raw material composition.

Herein, when M comprises Zn, the content of Zn is preferably 0.35% or less, but not 0, more preferably 0.05-0.3%, for example 0.05% or 0.25%, the percentage is the mass percentage to the total mass of the raw material composition.

Herein, when M comprises Bi, the content of Bi is preferably 0.35% or less, but not 0, more preferably 0.05-0.3%, for example 0.08%, 0.1%, 0.2% or 0.25%, the percentage is the mass percentage to the total mass of the raw material composition.

In the present invention, the content of Cu is preferably 0.05-0.15%, for example 0.05%, 0.06%, 0.08%, 0.1% or 0.15%; or, the content of Cu is preferably 0.1% or less, but not 0, for example 0.05%, 0.06% or 0.08%, the percentage is the mass percentage to the total mass of the raw material composition.

In the present invention, the way of adding Cu preferably comprises adding Cu during smelting and/or adding Cu during grain boundary diffusion.

When Cu is added during grain boundary diffusion, the content of Cu added during grain boundary diffusion is preferably 0.03-0.15%, for example 0.05%, the percentage is the mass percentage to the total mass of the raw material composition. When Cu is added during grain boundary diffusion, Cu is preferably added in the form of PrCu alloy; wherein, the mass percentage of Cu to PrCu is preferably 0.1-17%.

In the present invention, the content of B is preferably 0.97-1.1%, for example 0.99%, 1% or 1.1%, more preferably 0.99-1.1%, the percentage is the mass percentage to the total mass of the raw material composition.

In the present invention, the content of Fe is preferably 65-69.5%, for example 65.62%, 67.01%, 67.31%, 67.45%, 67.53%, 67.75%, 68.19%, 68.86%, 69% or 69.01%, more preferably 65.5-69%, the percentage is the mass percentage to the total mass of the raw material composition.

In the present invention, the raw material composition preferably further comprises Al.

Herein, the content of Al is preferably 0.3% or less, but not 0, more preferably 0.2% or less, but not 0, for example 0.1% or 0.2%, the percentage is the mass percentage to the total mass of the raw material composition.

In the present invention, when M comprises Ga, and Ga≤0.01%, preferably, Al+Ga+Cu≤0.11% in the composition of M element, the percentage is the mass percentage to the total mass of the raw material composition.

In the present invention, the raw material composition of neodymium-iron-boron magnet material preferably comprises the following components by mass percentage: R: 29.5-32.6%; R comprises R1 and R2, R1 is rare earth element added during smelting, which comprises Nd and Dy; R2 is rare earth element added during grain boundary diffusion, which comprises Tb, the content of R2 is 0.2%-0.9%; Co: 0.05-0.45%; the content of M is 0.35% or less, but not 0, M is one or more of Ga, Bi, and Zn; Cu: 0.05-0.15%; B: 0.97-1.1%; Fe: 65-69.5%; the percentage is the mass percentage of the mass of each component to the total mass of the raw material composition.

In the present invention, the raw material composition of neodymium-iron-boron magnet material preferably comprises the following components by mass percentage: R: 29.5-30.5%; R comprises R1 and R2, R1 is rare earth element added during smelting, which comprises Nd and Dy; R2 is rare earth element added during grain boundary diffusion, which comprises Tb, the content of R2 is 0.2%-0.8%; Co: 0.1-0.4%; M: 0.05-0.35%, M is one or more of Ga, Bi, and Zn; Cu: 0.05-0.08%; B: 0.99-1.1%; Fe: 65.5-69%; the percentage is the mass percentage of the mass of each component to the total mass of the raw material composition.

In a preferable embodiment of the present invention, the raw material composition of neodymium-iron-boron magnet material comprises the following components by mass percentage: R1: Nd 28.6%, Dy 0.05%, Pr 0.1%, R1 is rare earth element added during smelting; R2: Tb 1%, R2 is rare earth element added during grain boundary diffusion; Co 0.05%, Ga 0.05%, Al 0.1%, Cu 0.05%, B 0.99% and Fe 69.01%, the percentage is the mass percentage of the mass of each component to the total mass of the raw material composition.

In a preferable embodiment of the present invention, the raw material composition of neodymium-iron-boron magnet material comprises the following components by mass percentage: R1: Nd 28.6%, Dy 0.1%, Pr 0.2%, R1 is rare earth element added during smelting; R2: Tb 0.9%, R2 is rare earth element added during grain boundary diffusion; Co 0.05%, Ga 0.1%, Cu 0.05%, B 1% and Fe 69%, the percentage is the mass percentage of the mass of each component to the total mass of the raw material composition.

In a preferable embodiment of the present invention, the raw material composition of neodymium-iron-boron magnet material comprises the following components by mass percentage: R1: Nd 28.6%, Dy 0.08%, R1 is rare earth element added during smelting; R2: Tb 0.9%, R2 is rare earth element added during grain boundary diffusion; Co 0.1%, Ga 0.3%, Cu 0.06%, B 1.1% and Fe 68.86%, the percentage is the mass percentage of the mass of each component to the total mass of the raw material composition.

In a preferable embodiment of the present invention, the raw material composition of neodymium-iron-boron magnet material comprises the following components by mass percentage: R1: Nd 29.9%, Dy 0.1%, R1 is rare earth element added during smelting; R2: Tb 0.8%, Pr 0.1%, R2 is rare earth element added during grain boundary diffusion; Co 0.1%, Ga 0.2%, Al 0.2%, Cu 0.03% added during smelting, Cu 0.05% added during grain boundary diffusion, B 0.99% and Fe 67.53%, the percentage is the mass percentage of the mass of each component to the total mass of the raw material composition.

In a preferable embodiment of the present invention, the raw material composition of neodymium-iron-boron magnet material comprises the following components by mass percentage: R1: Nd 30.4%, Dy 0.05%, R1 is rare earth element added during smelting; R2: Tb 0.8%, Dy 0.1%, R2 is rare earth element added during grain boundary diffusion; Co 0.2%, Ga 0.35%, Cu 0.1%, B 0.99% and Fe 67.01%, the percentage is the mass percentage of the mass of each component to the total mass of the raw material composition.

In the present invention, the raw material composition of neodymium-iron-boron magnet material preferably comprises the following components by mass percentage: R: 30-31%; R comprises R1 and R2, R1 comprises Nd and Dy, and R1 is rare earth element added during smelting; the content of R2 is 0.5-0.7%, and R2 comprises Tb, and R2 is rare earth element added during grain boundary diffusion; Co: 0.1-0.3%; M: 0.1-0.35%, M is one or more of Ga, Bi, and Zn; Cu: 0.05-0.1%; B: 0.99%-1.1%; Fe: 67-69%; the percentage is the mass percentage of the mass of each component to the total mass of the raw material composition.

In a preferable embodiment of the present invention, the raw material composition of neodymium-iron-boron magnet material comprises the following components by mass percentage: R1: Nd 29.9%, Dy 0.1%, R1 is rare earth element added during smelting; R2: Tb 0.6%, R2 is rare earth element added during grain boundary diffusion; Co 0.2%, Zn 0.25%, Bi 0.1%, Cu 0.1%, B 1% and Fe 67.75%, the percentage is the mass percentage of the mass of each component to the total mass of the raw material composition.

In a preferable embodiment of the present invention, the raw material composition of neodymium-iron-boron magnet material comprises the following components by mass percentage: R1: Nd 29.9%, Dy 0.2%, R1 is rare earth element added during smelting; R2: Tb 0.6%, R2 is rare earth element added during grain boundary diffusion; Co 0.3%, Ga 0.05%, Zn 0.05%, Bi 0.25%, Cu 0.1%, B 1.1% and Fe 67.45%, the percentage is the mass percentage of the mass of each component to the total mass of the raw material composition.

In a preferable embodiment of the present invention, the raw material composition of neodymium-iron-boron magnet material comprises the following components by mass percentage: R1: Nd 30.4%, Dy 0.05%, R1 is rare earth element added during smelting; R2: Tb 0.3%, Pr 0.2%, R2 is rare earth element added during grain boundary diffusion; Co 0.4%, Bi 0.2%, Cu 0.12% added during smelting, Cu 0.03% added during grain boundary diffusion, B 0.99% and Fe 67.31%, the percentage is the mass percentage of the mass of each component to the total mass of the raw material composition.

In a preferable embodiment of the present invention, the raw material composition of neodymium-iron-boron magnet material comprises the following components by mass percentage: R1: Nd 32.1%, Dy 0.3%, R1 is rare earth element added during smelting; R2: Tb 0.2%, R2 is rare earth element added during grain boundary diffusion; Co 0.45%, Bi 0.08%, Cu 0.15%, B 1.1% and Fe 65.62%, the percentage is the mass percentage of the mass of each component to the total mass of the raw material composition.

The present invention further provides a preparation method for neodymium-iron-boron magnet material, which employs the raw material composition as described above; the preparation method can be conventional diffusion method in the field, wherein, R1 elements are added during smelting step, and R2 elements are added during grain boundary diffusion step.

In the present invention, the preparation method preferably comprises the following steps: the elements other than R2 in the raw material composition of neodymium-iron-boron magnet material as described above are subjected to smelting, powdering, forming, sintering to obtain a sinter, and then the mixture of the sinter and R2 is subjected to grain boundary diffusion.

Herein, the operations and conditions of the smelting can be conventional smelting process in the field. Generally, the elements other than R2 of the raw material composition of neodymium-iron-boron magnet material are smelted and casted by ingot casting process and strip-casting flake process to obtain alloy sheets.

A person skilled in the art knows that the rare earth element is usually lost in the smelting and sintering process, so in order to ensure the quality of the final product, generally, 0-0.3 wt. % of the rare earth element (generally Nd element) will be extra added in the smelting process on the basis of the formula of the raw material composition, and the percentage is the mass percentage of the mass of the additional added rare earth element relative to the total mass of the raw material composition; in addition, the content of the additional added rare earth element is not included in the raw material composition.

The temperature of the smelting can be 1300-1700° C., preferably 1450-1550° C., for example 1500° C.

The smelting environment can be vacuum with 0.05 Pa.

The smelting equipment is generally the mid-frequency vacuum smelting furnace, for example the mid-frequency vacuum induction strip casting furnace.

Herein, the operations and conditions of the powdering can be conventional powdering process in the field, generally, which comprises powdering with hydrogen decrepitation and/or powdering with jet milling.

The powdering with hydrogen decrepitation generally comprises hydrogen absorption, dehydrogenation and cooling treatment. The temperature of the hydrogen absorption is generally 20-200° C. The temperature of the dehydrogenation is generally 400-650° C., preferably 500-550° C. The pressure of the hydrogen absorption is preferably 50-600 kPa, preferably 300-500 kPa.

The powdering with jet milling is generally performed under the condition of 0.1-2 MPa, preferably 0.5-0.7 MPa. The airflow in the jet milling powdering can be Nitrogen. The time of the jet milling powdering can be 2-4 h.

Herein, the operations and conditions of the forming can be conventional forming process in the field, for example, magnetic field forming method. The strength of the magnetic field forming method is generally 1.5 T or more.

Herein, the operations and conditions of the sintering can be conventional sintering process in the field.

The sintering can be performed under the condition of the vacuum degree with 0.5 Pa or less.

The temperature of the sintering can be 1000-1200° C., preferably 1030-1090° C.

The time of the sintering can be 0.5-10 h, preferably 2-5 h.

In the present invention, a person skilled in the art knows that it is generally comprises coating operation of R2 before the grain boundary diffusion.

Herein, R2 is generally coated in the form of fluoride or low-melting-point alloy, for example Tb fluoride. When Dy is further comprised, preferably, Dy is coated in the form of Dy fluoride.

Herein, when R2 comprises Pr, preferably, Pr is added in the form of PrCu alloy.

When R2 comprises Pr, and Pr is involved in the grain boundary diffusion in the form of PrCu alloy, the mass ratio of Cu to PrCu alloy is preferably 0.1-17% in the PrCu alloy. The occasion of adding Cu in the preparation method is preferably in the grain boundary diffusion step, or both in the smelting step and the grain boundary diffusion step.

In the present invention, the operations and conditions of the grain boundary diffusion treatment can be conventional grain boundary diffusion process in the field.

The temperature of the grain boundary diffusion can be 800-1000° C., for example 850° C.

The time of the grain boundary diffusion can be 5-20 h, preferably 5-15 h.

After the grain boundary diffusion, the low temperature tempering treatment is further performed in accordance with the conventions in the field. The temperature of the low temperature tempering treatment is generally 460-560° C. Generally, the time of the low temperature tempering treatment can be 1-3 h.

The present invention further provides a neodymium-iron-boron magnet material, which comprises the following components by mass percentage:

R: 28-33%; R comprises R1 and R2, R1 comprises Nd and Dy, R2 comprises Tb, the content of R2 is 0.2-1%;

Co: <0.5%, but not 0;

M: ≤0.4%, but not 0, M is one or more of Bi, Sn, Zn, Ga, In, Au, and Pb;

Cu: ≤0.15%, but not 0;

B: 0.9-1.1%;

Fe: 60-70%; the percentage is the mass percentage of the mass of each component to the total mass of neodymium-iron-boron magnet material; the neodymium-iron-boron magnet material comprises $Nd_2Fe_{14}B$ grains and their shells, and two-grain intergranular boundary and grain boundary triangle region adjoining to the $Nd_2Fe_{14}B$ grains, wherein, the heavy rare earth elements in R1 are distributed in $Nd_2Fe_{14}B$ grains, R2 is mainly distributed in the shell, two-grain intergranular boundary and grain boundary triangle region, the area proportion of the grain boundary triangle region is 1.9-3.15%; the continuity of the two-grain intergranular boundary is 96% or more; the proportion of the mass of C and O in the grain boundary triangle region is 0.4-0.5%, the proportion of the mass of C and O in the two-grain intergranular boundary is 0.3-0.45%.

In the present invention, "the heavy rare earth elements in R1 are mainly distributed in $Nd_2Fe_{14}B$ grains" can be understood that the heavy rare earth elements in R1 are mainly distributed (generally referring to 95 wt % or more) in $Nd_2Fe_{14}B$ grains and a small amount distributed in the grain boundary caused by the conventional smelting and sintering process in the field. "R2 is mainly distributed in the shell" can be understood that R2 is mainly distributed (generally referring to 95 wt % or more) in the shell and grain boundary (two-grain intergranular boundary and grain boundary triangle region) of $Nd_2Fe_{14}B$ grains and a small part of R2 will also distribute into $Nd_2Fe_{14}B$ grains, such as the outer edge of $Nd_2Fe_{14}B$ grains, caused by the conventional grain boundary diffusion process in the field.

In the present invention, the calculation method of the continuity of grain boundary refers to the ratio of the length of the phases (phases, such as rich B phase, rich rare earth phase, rare earth oxides, rare earth carbides, etc.) except the empty hole in the grain boundary to the length of the total length of the grain boundary. The grain boundary with more than 96% continuity can be called continuous channels.

In the present invention, the grain boundary triangle region generally refers to the intersection of three or more grain boundaries, where distributes rich B phase, richer rare earth phase, rare earth oxides, rare earth carbides and empty holes. The calculation method of the area proportion of the grain boundary triangle region refers to the ratio of the area of the grain boundary triangle region to the total area of "grains and grain boundaries".

Herein, rare earth oxides and rare earth carbides are mainly produced by C and 0 elements which introduced during the preparation process. Due to the high content of rare earths in grain boundaries, in the magnet materials, C and O are usually more distributed in grain boundaries, which are in the form of rare earth carbides and rare earth oxides, respectively. What needs to be explained is: C and O elements are introduced by conventional method in the field which is generally impurity introduction or atmosphere introduction. Specifically, for example, additives will be introduced in the process of jet milling and suppression, when sintering, these additives will be removed by heating, but there will inevitably be a small amount of C and O elements residues. For another example, a small amount of 0 element will be inevitably introduced in the preparation process due to the atmosphere. In the present invention, by testing, the content of C and O elements in the final obtained neodymium-iron-boron magnet material products is only less than 1000 and 1200 ppm, respectively, which belongs to the conventional acceptable impurities range in the field, so it is not included in the statistical table of product elements.

In the present invention, the area proportion of the grain boundary triangle region is preferably 1.98-2.78%, for example 1.98%, 2.43%, 2.45%, 2.51%, 2.53%, 2.62%, 2.76% or 2.78%, more preferably 1.98-2.62%.

In the present invention, the continuity of the grain boundary is preferably 97% or more, for example 97.11%, 97.26%, 97.33%, 97.54%, 97.61%, 97.72%, 97.74% or 98.02%, more preferably 98% or more.

In the present invention, the mass proportion of C and O in the grain boundary triangle region is preferably 0.41-0.49%, for example 0.41%, 0.42%, 0.44%, 0.45%, 0.47% or 0.49%, more preferably 0.41-0.45%, the percentage is the ratio of the mass of C and O in the grain boundary triangle region to the total mass of all elements in the grain boundary.

In the present invention, the mass proportion of C and O in the two-grain intergranular boundary is preferably 0.32-0.41%, for example 0.32%, 0.34%, 0.36%, 0.37%, 0.38% or 0.41%, more preferably 0.34-0.41%, the percentage is the ratio of the mass of C and O in the two-grain intergranular boundary to the total mass of all elements in the grain boundary.

In the present invention, a person skilled in the art knows that C and O elements in the grain boundary phase usually exist in the form of rare earth carbides and rare earth oxides. So "the mass proportion of C and O in the grain boundary triangle region" and "the mass proportion of C and O in the two-grain intergranular boundary" are correspond to rare earth carbides hybrid phases and rare earth oxides hybrid phases, respectively. In addition, difference of "the mass proportion of C and O in the grain boundary triangle region" minus "the mass proportion of C and O in the two-grain intergranular boundary" in the Examples is decreased compared with the difference of Comparative Examples, so it can be concluded that hybrid phases (rare earth carbides and rare earth oxides) have been transferred from the grain boundary triangle region to the two-grain intergranular boundary, which mechanically explains the reason for improvement of continuity of the two-grain intergranular boundary.

In the present invention, in addition to the two hybrid phases of rare earth oxides and rare earth carbides, preferably, there is a new phase that can be detected in the two-grain intergranular boundary of the neodymium-iron-boron magnet material. The chemical composition of the new phase is $R_x(Fe+Co)_{100-x-y-z}Cu_yM_z$; wherein, R in the $R_x(Fe+Co)_{100-x-y-z}Cu_yM_z$ comprises one or more of Nd, Dy, and Tb; M is one or more of Bi, Sn, Zn, Ga, In, Au, and Pb; x is 42-44; y is 0.2-0.4; z is 0.2-0.45.

In the $R_x(Fe+Co)_{100-x-y-z}Cu_yM_z$, x is preferably 42.33-43.57, y is preferably 0.23-0.35, z is preferably 0.27-0.41.

In preferable embodiments of the present invention, for example, the chemical composition of the new phase is $R_{43}(Fe+Co)_{56.39}Cu_{0.29}M_{0.32}$, $R_{42.79}(Fe+Co)_{56.64}Cu_{0.23}M_{0.34}$, $R_{42.38}(Fe+CO)_{56.9}Cu_{0.35}M_{0.37}$, $R_{42.87}(Fe+CO)_{56.48}Cu_{0.31}M_{0.34}$, $R_{43.92}(Fe+CO)_{55.48}Cu_{0.28}M_{0.32}$, $R_{42.33}(Fe+CO)_{57.11}Cu_{0.29}M_{0.27}$, $R_{43.57}(Fe+Co)_{55.81}Cu_{0.26}M_{0.36}$, $R_{43.27}(Fe+Co)_{56.05}Cu_{0.27}M_{0.41}$, $R_{43.10}(Fe+Co)_{56.24}Cu_{0.34}M_{0.32}$.

The inventor speculates that the new phase is generated in the two-grain intergranular boundary, so it further improves the continuity of the grain boundary, thereby improving the magnetic performance.

In the present invention, the ratio of the area of the new phase in the two-grain intergranular boundary to the total area of the two-grain intergranular boundary is preferably 0.24-2.2%, for example 0.24%, 0.54%, 0.63%, 0.97%, 1.06%, 1.25%, 1.33%, 1.56% or 2.14%, more preferably 0.5-2.14%.

In the present invention, the content of R is preferably 29.5-32.6%, for example 29.58%, 29.75%, 29.8%, 30.6%, 30.7%, 30.9%, 30.95%, 31.35% or 32.6%, more preferably 29.5-30.5%, the percentage is the mass percentage to the total mass of the neodymium-iron-boron magnet material. In the present invention, excessive content of the rare earth element will reduce remanence; for example, when the total content of rare earth element is 32.6%, the remanence of the obtained neodymium-iron-boron magnet material will reduce.

In the present invention, the content of Nd in R1 can be conventional content in the field, preferably 28.5-32.5%, for example 28.6%, 29.9%, 30.4% or 32.1%, the percentage is the mass percentage to the total mass of the neodymium-iron-boron magnet material.

In the present invention, the content of Dy in R1 is preferably 0.3% or less, for example 0.05%, 0.08%, 0.1%, 0.2% or 0.3%, more preferably 0.05-0.3%, the percentage is the mass percentage to the total mass of the neodymium-iron-boron magnet material.

In the present invention, R1 can further comprises other conventional rare earth elements in the field, for example one or more of Pr, Ho, Tb, Gd, and Y.

Herein, when R1 comprises Pr, the added form of Pr can be conventional form in the field; for example, Pr is added in the form of PrNd, or in the form of a mixture of pure Pr and pure Nd, or in the form of the combination with "a mixture of PrNd, pure Pr and pure Nd". When Pr is added in the form of PrNd, the ratio of Pr to Nd is preferably 25:75 or 20:80; when Pr is added in the form of a mixture of pure Pr and pure Nd, or when the Pr is added in the form of the combination with "a mixture of PrNd, pure Pr and pure Nd", the content of Pr is preferably 0.1-2%, for example 0.2%, the percentage is the mass percentage to the total mass of the neodymium-iron-boron magnet material. Pure Pr or pure Nd described in the present invention generally means that the purity thereof is 99.5% or more.

Herein, when R1 comprises Ho, the content of Ho is preferably 0.1-0.2%, the percentage is the mass percentage to the total mass of the neodymium-iron-boron magnet material.

Herein, when R1 comprises Gd, the content of Gd is preferably 0.1-0.2%, the percentage is the mass percentage to the total mass of the neodymium-iron-boron magnet material.

Herein, when R1 comprises Y, the content of Y is preferably 0.1-0.2%, the percentage is the mass percentage to the total mass of the neodymium-iron-boron magnet material.

In the present invention, the content of R2 is preferably 0.2-0.9%, for example 0.2%, 0.5%, 0.6%, 0.8% or 0.9%, the percentage is the mass percentage to the total mass of the neodymium-iron-boron magnet material.

In the present invention, the content of Tb in R2 is preferably 0.2-1%, for example 0.2%, 0.6%, 0.8% or 0.9%, more preferably 0.5-1%, the percentage is the mass percentage to the total mass of the neodymium-iron-boron magnet material.

In the present invention, R2 in the neodymium-iron-boron magnet material preferably further comprises Pr and/or Dy.

Herein, when R2 comprises Pr, the content of Pr is preferably 0.2% or less, but not 0, for example 0.1%, the percentage is the mass percentage to the total mass of the neodymium-iron-boron magnet material.

Herein, when R2 comprises Dy, the content of Dy is preferably 0.3% or less, but not 0, more preferably 0.1-0.2%, for example 0.1%, the percentage is the mass percentage to the total mass of the neodymium-iron-boron magnet material.

In the present invention, the content of Co is preferably 0.05-0.45%, for example 0.05%, 0.1%, 0.2%, 0.3%, 0.4% or 0.45%, more preferably 0.1-0.4%, the percentage is the mass percentage to the total mass of the neodymium-iron-boron magnet material.

In the present invention, the content of M is preferably 0.35% or less, but not 0, more preferably 0.05-0.35%, for example 0.05%, 0.08%, 0.1%, 0.2%, 0.3% or 0.35%, the percentage is the mass percentage to the total mass of the neodymium-iron-boron magnet material.

In the present invention, the kind of M is preferably one or more of Zn, Ga, and Bi.

Herein, when M comprises Ga, the content of Ga is preferably 0.35% or less, but not 0, for example 0.05%, 0.1%, 0.2%, 0.3% or 0.35%, more preferably 0.1-0.35%, the percentage is the mass percentage to the total mass of the neodymium-iron-boron magnet material.

Herein, when M comprises Zn, the content of Zn is preferably 0.35% or less, but not 0, more preferably 0.05-0.3%, for example 0.05% or 0.25%, the percentage is the mass percentage to the total mass of the neodymium-iron-boron magnet material.

Herein, when M comprises Bi, the content of Bi is preferably 0.35% or less, but not 0, more preferably 0.05-0.3%, for example 0.08%, 0.1%, 0.2% or 0.25%, the percentage is the mass percentage to the total mass of the neodymium-iron-boron magnet material.

In the present invention, the content of Cu is preferably 0.05-0.15%, for example 0.05%, 0.06%, 0.08%, 0.1% or 0.15%; or, the content of Cu is preferably 0.1% or less, but not 0, for example 0.05%, 0.06% or 0.08%, the percentage is the mass percentage to the total mass of the neodymium-iron-boron magnet material.

In the present invention, the way of adding Cu preferably comprises adding during smelting and/or adding during the grain boundary diffusion.

When Cu is added during the grain boundary diffusion, the content of Cu added during the grain boundary diffusion is preferably 0.03-0.15%, for example 0.05%, the percentage is the mass percentage to the total mass of the neodymium-iron-boron magnet material. When Cu is added during the grain boundary diffusion, Cu is preferably added in the form of PrCu alloy, wherein, the mass percentage of Cu to PrCu is preferably 0.1-17%.

In the present invention, the content of B is preferably 0.97-1.1%, for example 0.99%, 1% or 1.1%, more preferably 0.99-1.1%, the percentage is the mass percentage to the total mass of the neodymium-iron-boron magnet material.

In the present invention, the content of Fe is preferably 65-69.5%, for example 65.62%, 67.01%, 67.31%, 67.45%, 67.53%, 67.75%, 68.19%, 68.86%, 69% or 69.01%, more preferably 65.5-69%, the percentage is the mass percentage to the total mass of the neodymium-iron-boron magnet material.

In the present invention, the neodymium-iron-boron magnet material preferably further comprises Al.

Herein, the content of Al is preferably 0.3% or less, but not 0, more preferably 0.2% or less, but not 0, for example 0.1% or 0.2%, the percentage is the mass percentage to the total mass of the neodymium-iron-boron magnet material.

In the present invention, when M comprises Ga, and Ga≤0.01%, preferably, Al+Ga+Cu≤0.11% in the composition of M element, the percentage is the mass percentage to the total mass of the neodymium-iron-boron magnet material.

In the present invention, the neodymium-iron-boron magnet material preferably comprises the following components by mass percentage: R: 29.5-32.6%; R comprises R1 and R2; R1 is a earth element added during smelting, which comprises Nd and Dy; R2 is a earth element added during grain boundary diffusion, which comprises Tb, the content of R2 is 0.2%-0.9%; Co: 0.05%-0.45%; the content of M is 0.35% or less, but not 0, M is one or more of Ga, Bi, and Zn; Cu: 0.05-0.15%; B: 0.97-1.05%; Fe: 65-69.5%; the percentage is the mass percentage of the mass of each component to the total mass of the neodymium-iron-boron magnet material; the neodymium-iron-boron magnet material comprises $Nd_2Fe_{14}B$ grains and their shells, and the two-grain intergranular boundary and grain boundary triangle region adjoining to the $Nd_2Fe_{14}B$ grains; wherein, the heavy rare earth elements in R1 are distributed in $Nd_2Fe_{14}B$ grains, and R2 is mainly distributed in shells, two-grain intergranular boundary and grain boundary triangle region; the area proportion of the grain boundary triangle region is 1.98-2.78%; the continuity of grain boundary of the neodymium-iron-boron magnet material is 97% or more; the mass proportion of C and O in the grain boundary triangle region is 0.41-0.49%, the mass proportion of C and O in the two-grain intergranular boundary is 0.32-0.41%; the two-grain intergranular boundary comprises a new phase with the chemical composition of $R_x(Fe+Co)_{100-x-y-z}Cu_yM_z$; wherein, R in the $R_x(Fe+Co)_{100-x-y-z}Cu_yM_z$ comprises one or more of Nd, Dy and Tb; M is one or more of Ga, Bi, and Zn; x is 42-44; y is 0.2-0.4; z is 0.2-0.45; the ratio of the area of the new phase in the two-grain intergranular boundary to the total area of the two-grain intergranular boundary is 0.24-2.2%.

In the present invention, the neodymium-iron-boron magnet material preferably comprises the following components by mass percentage: R: 29.5-30.5%; R comprises R1 and R2; R1 is rare earth element added during smelting, which comprises Nd and Dy; R2 is rare earth element added during grain boundary diffusion, which comprises Tb, the content of R2 is 0.2%-0.8%; Co: 0.1%-0.4%; M: 0.05%-0.35%, M is one or more of Ga, Bi, and Zn; Cu: 0.05-0.08%; B: 0.99-1.1%; Fe: 65.5-69%; the percentage is the mass percentage of the mass of each component to the total mass of the neodymium-iron-boron magnet material; the neodymium-iron-boron magnet material comprises $Nd_2Fe_{14}B$ grains and their shells, and two-grain intergranular boundary and grain boundary triangle region adjoining to the $Nd_2Fe_{14}B$ grains; wherein, the heavy rare earth elements in R1 are distributed in $Nd_2Fe_{14}B$ grains, R2 is mainly distributed in the shell, two-grain intergranular boundary and grain boundary triangle region, the area proportion of the grain boundary triangle region is 1.98-2.62%; the continuity of grain boundary of the neodymium-iron-boron magnet material is 98% or more; the mass proportion of C and O in the grain boundary triangle region is 0.41-0.45%, the mass proportion of C and O in the two-grain intergranular boundary is 0.34-0.41%; the two-grain intergranular boundary comprises a new phase with the chemical composition of $R_x(Fe+Co)_{100-x-y-z}Cu_yM_z$; wherein, R in the $R_x(Fe+Co)_{100-x-y-z}Cu_yM_z$ comprises one or more of Nd, Dy, and Tb; M is one or more of Ga, Bi, and Zn; x is 42.33-43.57; y is 0.23-0.35; z is 0.27-0.41; the ratio of the area of the new phase in the two-grain intergranular boundary to the total area of the two-grain intergranular boundary is 0.5-2.14%.

In a preferable embodiment of the present invention, the neodymium-iron-boron magnet material comprises the following components by mass percentage: R1: Nd 28.6%, Dy 0.05%, Pr 0.1%, R1 is rare earth element added during smelting; R2: Tb 1%, R2 is rare earth element added during grain boundary diffusion; Co 0.05%, Ga 0.05%, Al 0.1%, Cu 0.05%, B 0.99% and Fe 69.01%, the percentage is the mass percentage of the mass of each component to the total mass of the neodymium-iron-boron magnet material; the neodymium-iron-boron magnet material comprises $Nd_2Fe_{14}B$ grains and their shells, and two-grain intergranular boundary and grain boundary triangle region adjoining to the $Nd_2Fe_{14}B$ grains; wherein, the heavy rare earth elements in R1 are distributed in $Nd_2Fe_{14}B$ grains, R2 is mainly distributed in the shell, two-grain intergranular boundary and grain boundary triangle region, the area proportion of the grain boundary triangle region is 2.51%; the continuity of grain boundary of the neodymium-iron-boron magnet material is 97.72%; the mass proportion of C and O in the grain boundary triangle region is 0.49%, the mass proportion of C and O in the two-grain intergranular boundary is 0.38%; the two-grain intergranular boundary comprises a new phase with the chemical composition of R43(Fe+Co)$_{56.39}$Cu$_{0.29}$M$_{0.32}$, M is Ga; the ratio of the area of the new phase in the two-grain intergranular boundary to the total area of the two-grain intergranular boundary is 1.25%.

In a preferable embodiment of the present invention, the neodymium-iron-boron magnet material comprises the following components by mass percentage: R1: Nd 28.6%, Dy 0.1%, Pr 0.2%, R1 is rare earth element added during smelting; R2: Tb 0.9%, R2 is rare earth element added during grain boundary diffusion; Co 0.05%, Ga 0.1%, Cu 0.05%, B 1% and Fe 69%, the percentage is the mass percentage of the mass of each component to the total mass of the neodymium-iron-boron magnet material; the neodymium-iron-boron magnet material comprises $Nd_2Fe_{14}B$ grains and their shell, and two-grain intergranular boundary and grain boundary triangle region adjoining to the $Nd_2Fe_{14}B$ grains; wherein, the heavy rare earth elements in R1 are distributed in $Nd_2Fe_{14}B$ grains, R2 is mainly distributed in the shell, two-grain intergranular boundary and grain boundary triangle region, the area proportion of the grain boundary triangle region is 1.98%; the continuity of grain boundary of the neodymium-iron-boron magnet material is 96.99%; the mass proportion of C and O in the grain boundary triangle region is 0.45%, the mass proportion of C and O in the two-grain intergranular boundary is 0.34%; the two-grain intergranular boundary comprises a new phase with the chemical composition of R42.79(Fe+Co)$_{56.64}$Cu$_{0.23}$M$_{0.34}$, M is Ga; the ratio of the area of the new phase in the two-grain intergranular boundary to total area of the two-grain intergranular boundary is 2.14%.

In a preferable embodiment of the present invention, the neodymium-iron-boron magnet material comprises the following components by mass percentage: R1: Nd 28.6%, Dy 0.08%, R1 is rare earth element added during smelting; R2: Tb 0.9%, R2 is rare earth element added during grain boundary diffusion; Co 0.1%, Ga 0.3%, Cu 0.06%, B 1.1% and Fe 68.86%, the percentage is the mass percentage of the mass of each component to the total mass of the neodymium-iron-boron magnet material; the neodymium-iron-boron magnet material comprises $Nd_2Fe_{14}B$ grains and their shells, and two-grain intergranular boundary and grain boundary triangle region adjoining to the $Nd_2Fe_{14}B$ grains; wherein, the heavy rare earth elements in R1 are distributed in $Nd_2Fe_{14}B$ grains, R2 is mainly distributed in the shell, two-grain intergranular boundary and grain boundary triangle region, the area proportion of the grain boundary triangle region is 2.62%; the continuity of grain boundary of the neodymium-iron-boron magnet material is 97.11%; the mass proportion of C and O in the grain boundary triangle region is 0.41%, the mass proportion of C and O in the two-grain intergranular boundary is 0.38%; the two-grain intergranular boundary comprises a new phase with the chemical composition of R42.38(Fe+Co)$_{56.9}$Cu$_{0.35}$M$_{0.37}$, M is Ga; the ratio of the area of the new phase in the two-grain intergranular boundary to the total area of the two-grain intergranular boundary is 0.97%.

In a preferable embodiment of the present invention, the neodymium-iron-boron magnet material comprises the following components by mass percentage: R1: Nd 29.9%, Dy 0.1%, R1 is rare earth element added during smelting; R2: Tb 0.8%, Pr 0.1%, R2 is rare earth element added during grain boundary diffusion; Co 0.1%, Ga 0.2%, Al 0.2%, Cu 0.08%, B 0.99% and Fe 67.53%, the percentage is the mass percentage of the mass of each component to the total mass of the neodymium-iron-boron magnet material; the neodymium-iron-boron magnet material comprises $Nd_2Fe_{14}B$ grains and their shells, and two-grain intergranular boundary and grain boundary triangle region adjoining to the $Nd_2Fe_{14}B$ grains; wherein, the heavy rare earth elements in R1 are distributed in $Nd_2Fe_{14}B$ grains, R2 is mainly distributed in the shell, two-grain intergranular boundary and grain boundary triangle region, the area proportion of the grain boundary triangle region is 2.76%; the continuity of grain boundary of the neodymium-iron-boron magnet material is 97.54%; the mass proportion of C and O in the grain boundary triangle region is 0.42%, the mass proportion of C and O in the two-grain intergranular boundary is 0.38%; the two-grain intergranular boundary comprises a new phase with the chemical composition of R42.87(Fe+Co)$_{56.48}$Cu$_{0.31}$M$_{0.34}$, M is Ga; the ratio of the area of the new phase in the two-grain intergranular boundary to the total area of the two-grain intergranular boundary is 1.06%.

In a preferable embodiment of the present invention, the raw material composition of neodymium-iron-boron magnet material comprises the following components by mass percentage: R1: Nd 30.4%, Dy 0.05%, R1 is rare earth element added during smelting; R2: Tb 0.8%, Dy 0.1%, R2 is rare earth element added during grain boundary diffusion; Co 0.2%, Ga 0.35%, Cu 0.1%, B 0.99% and Fe 67.01%, the percentage is the mass percentage of the mass of each component to the total mass of the neodymium-iron-boron magnet material; the neodymium-iron-boron magnet material comprises $Nd_2Fe_{14}B$ grains and their shells, and two-grain intergranular boundary and grain boundary triangle region adjoining to the $Nd_2Fe_{14}B$ grains; wherein, the heavy rare earth elements in R1 are distributed in $Nd_2Fe_{14}B$ grains, R2 is mainly distributed in the shell, two-grain intergranular boundary and grain boundary triangle region, the area proportion of the grain boundary triangle region is 2.53%; the continuity of grain boundary of the neodymium-iron-boron magnet material is 97.74%; the mass proportion of C and O in the grain boundary triangle region is 0.45%, the mass proportion of C and O in the two-grain intergranular boundary is 0.41%; the two-grain intergranular boundary comprises a new phase with the chemical composition of $R_{43.92}$(Fe+Co)$_{55.48}$Cu$_{0.28}$M$_{0.32}$, M is Ga; the ratio of the area of the new phase in the two-grain intergranular boundary to the total area of the two-grain intergranular boundary is 1.33%.

In the present invention, the neodymium-iron-boron magnet material preferably comprises the following components by mass percentage: R 30-31%; R comprises R1 and R2, R1 is rare earth element added during smelting, which comprises Nd and Dy; R2 is rare earth element added during grain boundary diffusion, which comprises Tb, the content of R2 is 0.5-0.7%; Co 0.1-0.3%; M 0.1-0.35%, M is one or more of Ga, Bi, and Zn; Cu 0.05-0.1%; B 0.99%-1.1%; Fe 67-69%; the percentage is the mass percentage of the mass of each component to the total mass of the neodymium-iron-boron magnet material; the neodymium-iron-boron magnet material comprises $Nd_2Fe_{14}B$ grains and their shells, and two-grain intergranular boundary and grain boundary triangle region adjoining to the $Nd_2Fe_{14}B$ grains; wherein, the heavy rare earth elements in R1 are distributed in $Nd_2Fe_{14}B$ grains, R2 is mainly distributed in the shell, two-grain intergranular boundary and grain boundary triangle region, the area proportion of the grain boundary triangle region is 1.98-2.62%; the continuity of grain boundary of the neodymium-iron-boron magnet material is 97% or more; the mass proportion of C and O in the grain boundary triangle region is 0.41-0.45%%, the mass proportion of C and O in the two-grain intergranular boundary is 0.34-0.41%; the two-grain intergranular boundary comprises a new phase with the chemical composition of $R_x$(Fe+

$Co)_{100-x-y-z}Cu_yM_z$; wherein, R in the $R_x(Fe+Co)_{100-x-y-z}Cu_yM_z$ comprises one or more of Nd, Dy, and Tb; M is one or more of Ga, Bi, and Zn; x is 42-44; y is 0.25-0.35; z is 0.27-0.37; the ratio of the area of the new phase in the two-grain intergranular boundary to the total area of the two-grain intergranular boundary is 0.5-2.14%.

In a preferable embodiment of the present invention, the neodymium-iron-boron magnet material comprises the following components by mass percentage: R1: Nd 29.9%, Dy 0.1%, R1 is rare earth element added during smelting; R2: Tb 0.6%, R2 is rare earth element added during grain boundary diffusion; Co 0.2%, Zn 0.25%, Bi 0.1%, Cu 0.1%, B 1% and Fe 67.75%, the percentage is the mass percentage of the mass of each component to the total mass of the neodymium-iron-boron magnet material; the neodymium-iron-boron magnet material comprises $Nd_2Fe_{14}B$ grains and their shells, and two-grain intergranular boundary and grain boundary triangle region adjoining to the $Nd_2Fe_{14}B$ grains; wherein, the heavy rare earth elements in R1 are distributed in $Nd_2Fe_{14}B$ grains, R2 is mainly distributed in the shell, two-grain intergranular boundary and grain boundary triangle region, the area proportion of the grain boundary triangle region is 2.45%; the continuity of grain boundary of the neodymium-iron-boron magnet material is 97.26%; the mass proportion of C and O in the grain boundary triangle region is 0.45%, the mass proportion of C and O in the two-grain intergranular boundary is 0.37%; the two-grain intergranular boundary comprises a new phase with the chemical composition of $R_{42.33}(Fe+Co)_{57.11}Cu_{0.29}M_{0.27}$, M is Zn and/or Bi; the ratio of the area of the new phase in the two-grain intergranular boundary to the total area of the two-grain intergranular boundary is 0.54%.

In a preferable embodiment of the present invention, the neodymium-iron-boron magnet material comprises the following components by mass percentage: R1: Nd 29.9%, Dy 0.2%, R1 is rare earth element added during smelting; R2: Tb 0.6%, R2 is rare earth element added during grain boundary diffusion; Co 0.3%, Ga 0.05%, Zn 0.05%, Bi 0.25%, Cu 0.1%, B 1.1% and Fe 67.45%, the percentage is the mass percentage of the mass of each component to the total mass of the neodymium-iron-boron magnet material; the neodymium-iron-boron magnet material comprises $Nd_2Fe_{14}B$ grains and their shells, and two-grain intergranular boundary and grain boundary triangle region adjoining to the $Nd_2Fe_{14}B$ grains; wherein, the heavy rare earth elements in R1 are distributed in $Nd_2Fe_{14}B$ grains, R2 is mainly distributed in the shell, two-grain intergranular boundary and grain boundary triangle region, the area proportion of the grain boundary triangle region is 2.43%; the continuity of grain boundary of the neodymium-iron-boron magnet material is 97.61%; the mass proportion of C and O in the grain boundary triangle region is 0.44%, the mass proportion of C and O in the two-grain intergranular boundary is 0.32%; the two-grain intergranular boundary comprises a new phase with the chemical composition of $R43.57(Fe+Co)_{55.81}Cu_{0.26}M_{0.36}$, M is Zn and/or Ga; the ratio of the area of the new phase in the two-grain intergranular boundary to the total area of the two-grain intergranular boundary is 1.56%.

In a preferable embodiment of the present invention, the neodymium-iron-boron magnet material comprises the following components by mass percentage: R1: Nd 30.4%, Dy 0.05%, R1 is rare earth element added during smelting; R2: Tb 0.3%, Pr 0.2%, R2 is rare earth element added during grain boundary diffusion; Co 0.4%, Bi 0.2%, Cu 0.15%, B 0.99% and Fe 67.31%, the percentage is the mass percentage of the mass of each component to the total mass of the neodymium-iron-boron magnet material; the neodymium-iron-boron magnet material comprises $Nd_2Fe_{14}B$ grains and their shells, and two-grain intergranular boundary and grain boundary triangle region adjoining to the $Nd_2Fe_{14}B$ grains; wherein, the heavy rare earth elements in R1 are distributed in $Nd_2Fe_{14}B$ grains, R2 is mainly distributed in the shell, two-grain intergranular boundary and grain boundary triangle region, the area proportion of the grain boundary triangle region is 2.78%; the continuity of grain boundary of the neodymium-iron-boron magnet material is 97.33%; the mass proportion of C and O in the grain boundary triangle region is 0.42%, the mass proportion of C and O in the two-grain intergranular boundary is 0.36%; the two-grain intergranular boundary comprises a new phase with the chemical composition of $R43.27(Fe+Co)_{56.05}Cu_{0.27}M_{0.41}$, M is Bi; the ratio of the area of the new phase in the two-grain intergranular boundary to the total area of the two-grain intergranular boundary is 0.63%.

In a preferable embodiment of the present invention, the neodymium-iron-boron magnet material comprises the following components by mass percentage: R1: Nd 32.1%, Dy 0.3%, R1 is rare earth element added during smelting; R2: Tb 0.2%, R2 is rare earth element added during grain boundary diffusion; Co 0.45%, Bi 0.08%, Cu 0.15%, B 1.1% and Fe 65.62%, the percentage is the mass percentage of the mass of each component to the total mass of the neodymium-iron-boron magnet material; the neodymium-iron-boron magnet material comprises $Nd_2Fe_{14}B$ grains and their shells, and two-grain intergranular boundary and grain boundary triangle region adjoining to the $Nd_2Fe_{14}B$ grains; wherein, the heavy rare earth elements in R1 are distributed in $Nd_2Fe_{14}B$ grains, R2 is mainly distributed in the shell, two-grain intergranular boundary and grain boundary triangle region, the area proportion of the grain boundary triangle region is 3.15%; the continuity of grain boundary of the neodymium-iron-boron magnet material is 98.02%; the mass proportion of C and O in the grain boundary triangle region is 0.47%, the mass proportion of C and O in the two-grain intergranular boundary is 0.34%; the two-grain intergranular boundary comprises a new phase with the chemical composition of $R_{43.10}(Fe+Co)_{56.24}Cu_{0.34}M_{0.32}$, M is Bi; the ratio of the area of the new phase in the two-grain intergranular boundary to the total area of the two-grain intergranular boundary is 0.24%.

The neodymium-iron-boron magnet material provided by the present invention rationally controls the content range of the total rare earth elements (TRE), Co, Cu, and M (Ga, Zn, etc.) elements and combines the specific adding occasion of heavy rare earth elements, which leads to the hybrid phases (rare earth oxides and rare earth carbides) more distributed in the two-grain intergranular boundary rather than reunited in the grain boundary triangle region, and thereby the continuity of the grain boundary is improved and the area of the grain boundary triangle region is reduced, which is beneficial to obtain higher density and improves the remanence Br of the magnet. It also promotes Tb element mainly uniformly distributed in the grain boundary and shell of the main phase, which improves the coercivity Hcj of the magnet.

The present invention further provides an application of the neodymium-iron-boron magnet material as described above in the preparation of magnet steel.

Herein, the magnet steel is preferably 54SH, 54UH, or 56SH magnet steel.

On the basis of conforming to the common knowledge in the field, the above optimal conditions can be combined at will, so as to obtain preferable embodiments of the present invention.

The reagents and raw materials used in the present invention are commercially available.

The positive progressive effects of the present invention are as follows: by the coordination between the specific content of various elements, under the premise of adding only a small amount of Co and heavy rare earth elements, on the basis of the existing neodymium-iron-boron magnet material, the neodymium-iron-boron magnet material in the present invention has an increase proportion of the hybrid phase (rare earth oxide, rare earth carbides) in two-grain intergranular boundary, and generates a new phase in the two-grain intergranular boundary. Correspondingly, the continuity of the two-grain intergranular boundary is increased, and the proportion of hybrid phase in the grain boundary triangle region is decreased, and correspondingly the area of the grain boundary triangle region is decreased. Thereby, the remanence Br, coercivity Hcj, and corresponding temperature stability of the neodymium-iron-boron magnet material are improved. Herein, the remanence can reach 14.37-14.72 kGs, the coercivity can reach 24.64-26.88 kOe, and the Br temperature coefficient at 20-120° C. can reach −0.101-0.106.

BRIEF DESCRIPTION OF THE DRAWINGS

FIG. 1 is an EPMA micro-structural diagram of the neodymium-iron-boron magnet material of Example 4. The point indicated by arrow 1 in the FIGURE is the new phase of Rx(Fe+Co)100-x-y-zCuyMz which is contained in two-grain intergranular boundary, and the position indicated by the arrow 2 refers to the grain boundary triangle region, and the position indicated by arrow 3 refers to the $Nd_2Fe_{14}B$ main phase.

DETAILED DESCRIPTION OF THE PREFERRED EMBODIMENT

The following examples further illustrate the present disclosure, but the present disclosure is not limited thereto. Experiment methods in which specific conditions are not indicated in the following embodiments are selected according to conventional methods and conditions, or according to the product specification.

1. The raw material composition of neodymium-iron-boron magnet material of Examples 1-9 and Comparative Examples 1-4 are shown in Table 1 below.

2. The Preparation Method of the Neodymium-Iron-Boron Magnet Material of Example 1.

(1) Smelting and casting process: according to the formulation in Table 1, the prepared raw materials other than R2 (R2 in Example 4 and Example 8 was added in the form of PrCu, and the content of Cu added in the grain boundary diffusion step in Example 4 and Example 8 was 0.05 wt. % and 0.03 wt. % respectively. The content of Cu added in the smelting step in Example 4 and Example 8 was 0.03 wt. % and 0.12 wt. % respectively.) were put into a crucible made of alumina and were vacuum smelted in a high frequency vacuum smelting furnace with 0.05 Pa of vacuum at a temperature of 1500° C. Ar gas was introduced into the mid-frequency vacuum induction strip casting furnace, and the casting was carried out, and the alloy was quenched to obtain the alloy sheet.

(2) Hydrogen decrepitation powdering process: the hydrogen decrepitation furnace in which the quench alloy was placed was evacuated at room temperature, and then hydrogen with 99.9% purity was introduced into the hydrogen decrepitation furnace to maintain the hydrogen pressure at 90 kPa, after full hydrogen absorption, the temperature was raised while vacuuming to fully dehydrogenate; then cooling was carried out and the powder after hydrogen decrepitation was taken out. Herein, the temperature of hydrogen absorption was room temperature, and the temperature of dehydrogenation was 550° C.

(3) Jet milling powdering process: the powder after hydrogen decrepitation was pulverized by jet mill for 3 hours under a nitrogen atmosphere and a pressure of 0.6 MPa in the pulverization chamber to obtain a fine powder.

(4) Forming process: the powder pulverized by jet mill was formed in the strength of the magnetic field 1.5 T or more.

(5) Sintering process: Each formed body was moved into the sintering furnace for sintering, which was sintered in 0.5 Pa or less of vacuum degree and at 1030° C.-1090° C. for 2-5 h to obtain sintered body.

TABLE 1

Formulations and contents (wt. %) for the raw material compositions of the neodymium-iron-boron magnet materials.

| | R1 | | | R2 | | | | M | | | | | | |
|---|---|---|---|---|---|---|---|---|---|---|---|---|---|---|
| | Nd | Dy | Pr | Tb | Pr | Dy | Co | Ga | Zn | Bi | Al | Cu | B | Fe |
| Example 1 | 28.6 | 0.05 | 0.1 | 1 | / | / | 0.05 | 0.05 | / | / | 0.1 | 0.05 | 0.99 | 69.01 |
| Example 2 | 28.6 | 0.1 | 0.2 | 0.9 | / | / | 0.05 | 0.1 | / | / | / | 0.05 | 1 | 69 |
| Example 3 | 28.6 | 0.08 | / | 0.9 | / | / | 0.1 | 0.3 | / | / | / | 0.06 | 1.1 | 68.86 |
| Example 4 | 29.9 | 0.1 | / | 0.8 | 0.1 | / | 0.1 | 0.2 | / | / | 0.2 | 0.08 | 0.99 | 67.53 |
| Example 5 | 30.4 | 0.05 | / | 0.8 | / | 0.1 | 0.2 | 0.35 | / | / | / | 0.1 | 0.99 | 67.01 |
| Example 6 | 29.9 | 0.1 | / | 0.6 | / | / | 0.2 | | 0.25 | 0.1 | / | 0.1 | 1 | 67.75 |
| Example 7 | 29.9 | 0.2 | / | 0.6 | / | / | 0.3 | 0.05 | 0.05 | 0.25 | / | 0.1 | 1.1 | 67.45 |
| Example 8 | 30.4 | 0.05 | / | 0.3 | 0.2 | / | 0.4 | / | / | 0.2 | / | 0.15 | 0.99 | 67.31 |
| Example 9 | 32.1 | 0.3 | / | 0.2 | / | / | 0.45 | / | / | 0.08 | / | 0.15 | 1.1 | 65.62 |
| Comparative Example 1 | 29.9 | 0.1 | / | | 0.1 | 0.8 | 0.1 | 0.2 | / | / | 0.2 | 0.08 | 0.99 | 67.53 |
| Comparative Example 2 | 29.9 | 0.1 | / | 0.8 | 0.1 | / | 0.1 | 0.2 | / | / | 0.2 | 0.25 | 0.99 | 67.36 |
| Comparative Example 3 | 29.9 | 0.1 | / | 0.6 | / | / | 0.15 | | / | / | | 0.07 | 0.99 | 68.19 |
| Comparative Example 4 | 29.9 | 0.1 | / | 0.8 | 0.1 | / | 0.1 | 0.45 | / | / | 0.2 | 0.08 | 0.99 | 67.28 |

Note:
"/" means that the element is not comprised, wt. % refers to mass percentage.

(6) Grain boundary diffusion process: after purifying the surface of the sintered body, R2 (For example, one or more of the alloy or fluoride of Tb, the alloy or fluoride of Dy and PrCu alloy, wherein, the Cu was added both in the smelting step and the grain boundary diffusion step.) was coated on the surface of the sintered body, and diffused with the temperature of 850° C. for 5-15 h, then cooled to room temperature, and then performed the low temperature tempering at a temperature of 460-560° C. for 1-3 h.

Parameters in the preparation method for neodymium-iron-boron magnet materials of Examples 2-9 and Comparative Examples 1~4 were the same as Example 1.

3. Components measurement: determine the neodymium-iron-boron magnet material of Examples 1-9 and Comparative Examples 1~4 with high-frequency inductively coupled plasma emission spectrometer (ICP-OES). The testing results were shown in Table 2 below.

TABLE 2

Components and content (wt. %) of the neodymium-iron-boron magnet materials.

| | R1 | | | R2 | | | | M | | | | | | |
|---|---|---|---|---|---|---|---|---|---|---|---|---|---|---|
| | Nd | Dy | Pr | Tb | Pr | Dy | Co | Ga | Zn | Bi | Al | Cu | B | Fe |
| Example 1 | 28.6 | 0.05 | 0.1 | 1 | / | / | 0.05 | 0.05 | / | / | 0.1 | 0.05 | 0.99 | 69.01 |
| Example 2 | 28.6 | 0.1 | 0.2 | 0.9 | / | / | 0.05 | 0.1 | / | / | / | 0.05 | 1 | 69 |
| Example 3 | 28.6 | 0.08 | / | 0.9 | / | / | 0.1 | 0.3 | / | / | / | 0.06 | 1.1 | 68.86 |
| Example 4 | 29.9 | 0.1 | / | 0.8 | 0.1 | / | 0.1 | 0.2 | / | / | 0.2 | 0.08 | 0.99 | 67.53 |
| Example 5 | 30.4 | 0.05 | / | 0.8 | / | 0.1 | 0.2 | 0.35 | / | / | / | 0.1 | 0.99 | 67.01 |
| Example 6 | 29.9 | 0.1 | / | 0.6 | / | / | 0.2 | | 0.25 | 0.1 | / | 0.1 | 1 | 67.75 |
| Example 7 | 29.9 | 0.2 | / | 0.6 | / | / | 0.3 | 0.05 | 0.05 | 0.25 | / | 0.1 | 1.1 | 67.45 |
| Example 8 | 30.4 | 0.05 | / | 0.3 | 0.2 | / | 0.4 | / | / | 0.2 | / | 0.15 | 0.99 | 67.31 |
| Example 9 | 32.1 | 0.3 | / | 0.2 | / | / | 0.45 | / | / | 0.08 | / | 0.15 | 1.1 | 65.62 |
| Comparative Example 1 | 29.9 | 0.1 | / | | 0.1 | 0.8 | 0.1 | 0.2 | / | / | 0.2 | 0.08 | 0.99 | 67.53 |
| Comparative Example 2 | 29.9 | 0.1 | / | 0.8 | 0.1 | / | 0.1 | 0.2 | / | / | 0.2 | 0.25 | 0.99 | 67.36 |
| Comparative Example 3 | 29.9 | 0.1 | / | 0.6 | / | / | 0.15 | | / | / | | 0.07 | 0.99 | 68.19 |
| Comparative Example 4 | 29.9 | 0.1 | / | 0.8 | 0.1 | / | 0.1 | 0.45 | / | / | 0.2 | 0.08 | 0.99 | 67.28 |

Note:
"/" means that the element is not comprised, wt. % refers to mass percentage.

Effect Example 1

Neodymium-iron-boron magnet materials of Examples 1-9 and Comparative Examples 1~4 were determined as follows:

1. Magnetic properties determination: The sintering magnet were tested for magnetic properties by using the PFM-14 magnetic properties measuring instrument of the British Hirs company. The determined magnetic properties comprise the remanence at 20° C. and 120° C., the coercivity at 20° C. and 120° C., and the corresponding remanence temperature coefficient. Herein, the formula for calculating the remanence temperature coefficients is: $(Br_{high\ temperature}-Br_{room\ temperature})/(Br_{room\ temperature}$ (high temperature-room temperature))×100%, the test results are shown in Table 3 below.

2. FE-EPMA determination: The perpendicularly oriented surface of the neodymium-iron-boron magnet materials was polished and tested by the Field Emission Electron Probe Micro-Analyzer (FE-EPMA) (Japan Electronics Company (JEOL), 8530F). Testing the area proportion of the grain boundary triangle region, the continuity of two-grain intergranular boundary, the proportion of the mass of C and 0, and the new phase.

The continuity of the two-grain intergranular boundary was calculated based on the back scattering picture of EPMA. The proportion of the mass of C and O in the two-grain intergranular boundary and the grain boundary triangle region, and the new phase were measured by EPMA element analysis.

The area proportion (%) of the grain boundary triangle region refers to the ratio of the area of the grain boundary triangle region to the total area of "grains and grain boundaries".

The continuity (%) of two-grain intergranular boundary refers to the ratio of the length of the phases (phase, such as rich B phase, rich rare earth phase, rare earth oxides, rare earth carbides, etc.) except the empty hole in the grain boundary to the total length of the grain boundary.

The proportion (%) of the mass of C and O in the grain boundary triangle region refers to the ratio of the mass of C and O in the grain boundary triangle region to the total mass of all elements in the grain boundary.

The proportion (%) of the mass of C and O in the two-grain intergranular boundary refers to the ratio of the mass of C and O in the two-grain intergranular boundary to the total mass of all elements in the grain boundary.

The proportion (%) of the area of the new phase in the two-grain intergranular boundary refers to the ratio of the area of the new phase in the two-grain intergranular boundary to total area of the two-grain intergranular boundary.

TABLE 3

| | Br (kGs) | Hcj (kOe) | 120° C. Br (kGs) | 20-120° C. Br temperature coefficient α(Br)%/° C. | The area proportion (%) of the triangle region | The continuity (%) of the two-grain inter-granular boundary phase | The proportion (%) of the mass of C and O in the grain boundary triangle region | The proportion (%) of the mass of C and O in the two-grain inter-granular boundary | New phase | The proportion (%) of the area of the new phase in the two-grain inter-granular boundary |
|---|---|---|---|---|---|---|---|---|---|---|
| Example 1 | 14.63 | 25.72 | 13.11 | −0.104 | 2.51 | 97.72 | 0.49 | 0.38 | $R_{43}(Fe + Co)_{56.39}Cu_{0.29}M_{0.32}$ | 1.25 |
| Example 2 | 14.72 | 24.98 | 13.17 | −0.105 | 1.98 | 96.99 | 0.45 | 0.34 | $R_{42.79}(Fe + Co)_{56.64}Cu_{0.23}M_{0.34}$ | 2.14 |
| Example 3 | 14.66 | 24.93 | 13.12 | −0.105 | 2.62 | 97.11 | 0.41 | 0.38 | $R_{42.38}(Fe + Co)_{56.9}Cu_{0.35}M_{0.37}$ | 0.97 |
| Example 4 | 14.61 | 26.72 | 13.06 | −0.106 | 2.76 | 97.54 | 0.42 | 0.38 | $R_{42.87}(Fe + Co)_{56.48}Cu_{0.31}M_{0.34}$ | 1.06 |
| Example 5 | 14.55 | 26.88 | 13.02 | −0.105 | 2.53 | 97.74 | 0.45 | 0.41 | $R_{43.92}(Fe + Co)_{55.48}Cu_{0.28}M_{0.32}$ | 1.33 |
| Example 6 | 14.63 | 24.89 | 13.11 | −0.104 | 2.45 | 97.26 | 0.45 | 0.37 | $R_{42.33}(Fe + Co)_{57.11}Cu_{0.29}M_{0.27}$ | 0.54 |
| Example 7 | 14.61 | 25.01 | 13.07 | −0.105 | 2.43 | 97.61 | 0.44 | 0.32 | $R_{43.57}(Fe + Co)_{55.81}Cu_{0.26}M_{0.36}$ | 1.56 |
| Example 8 | 14.62 | 24.93 | 13.13 | −0.102 | 2.78 | 97.33 | 0.42 | 0.36 | $R_{43.27}(Fe + Co)_{56.05}Cu_{0.27}M_{0.41}$ | 0.63 |
| Example 9 | 14.37 | 24.64 | 12.92 | −0.101 | 3.15 | 98.02 | 0.47 | 0.34 | $R_{43.10}(Fe + Co)_{56.24}Cu_{0.34}M_{0.32}$ | 0.24 |
| Comparative Example 1 | 14.6 | 22.93 | 13.06 | −0.105 | 3.67 | 96.21 | 0.58 | 0.21 | x | 0 |
| Comparative Example 2 | 14.51 | 23.17 | 12.96 | −0.107 | 3.59 | 96.37 | 0.54 | 0.25 | x | 0 |
| Comparative Example 3 | 14.48 | 24.11 | 12.91 | −0.108 | 3.88 | 96.19 | 0.51 | 0.24 | x | 0 |
| Comparative Example 4 | 14.43 | 24.14 | 12.85 | −0.109 | 3.92 | 96.43 | 0.53 | 0.26 | x | 0 |

Note:
"x"means that there is no new phase with the chemical composition of $R_x(Fe + Co)_{100-x-y-z}Cu_yM_z$ in the two-grain intergranular boundary.

From the above Table 3, it can be seen that the present invention can reach the level which is equivalent to adding a large amount of Co and heavy rare earth elements under condition of adding a small amount of heavy rare earth elements and without adding Co element. In addition, due to the high content of the rare earth in the grain boundary, C and 0 are more distributed in the grain boundary, and they exist in the form of rare earth carbides and rare earth oxides. Compared with Comparative Examples 1-4, the differences of "the mass proportion of C and O in the grain boundary triangle region" minus "the mass proportion (%) of C and O in the two-grain intergranular boundary" in the Examples 1-9 are all decrease, so it can be concluded that hybrid phases (rare earth carbides and rare earth oxides) have been transferred from the grain boundary triangle region to the two-grain intergranular boundary, which mechanically explains the reason for improvement of continuity of the two-grain intergranular boundary.

Effect Example 2

As shown in FIG. 1, it is an EPMA micro-structural diagram of the prepared neodymium-iron-boron magnet material of Example 4. The point indicated by arrow 1 in the FIGURE is the new phase $R_x(Fe+Co)_{100-x-y-z}Cu_yM_z$ which is contained in two-grain intergranular boundary (light gray region), and the position indicated by the arrow 2 refers to the grain boundary triangle region (silver white region), and the position indicated by arrow 3 refers to the $Nd_2Fe_{14}B$ main phase (deep gray region). Combined with the data of Table 3, it can be further seen that the region of the grain boundary triangle region is less than that of the conventional magnetic material.

What is claimed is:

1. A neodymium-iron-boron magnet material, which comprises the following components by mass percentage:

R: 28-33%; R comprises R1 and R2, R1 comprises Nd and Dy, R2 comprises Tb, the content of R2 is 0.2%-1%; the content of Dy in R1 is 0.05-0.3%;

Co: 0.05-0.45%;

M: ≤0.4%, but not 0, M is at least one element selected from group consisting of Bi, Sn, Zn, Ga, In, Au, and Pb;

Cu: ≤0.15%, but not 0;

B: 0.9-1.1%;

Fe: 60-70%;

C; and

O;

the percentage is the mass percentage of the mass of each component to the total mass of neodymium-iron-boron magnet material;

the neodymium-iron-boron magnet material comprises $Nd_2Fe_{14}B$ grains and their shells, and two-grain intergranular boundary and grain boundary triangle region adjoining to the $Nd_2Fe_{14}B$ grains; wherein, heavy rare earth elements in R1 are distributed in $Nd_2Fe_{14}B$ grains, R2 is mainly distributed in the shell, two-grain intergranular boundary and grain boundary triangle region, the area proportion of the grain boundary triangle region is 1.9-3.15%; the continuity of the two-grain intergranular boundary is 96% or more; the proportion of the mass of C and O in the grain boundary triangle region is 0.4-0.5%, the proportion of the mass of C and O in the two-grain intergranular boundary is 0.3-0.45%; wherein, the continuity of two-grain intergranular boundary refers to the ratio of the length of a B rich phase, a rare earth rich phase, rare earth oxides and rare earth carbides in the grain boundary to the total length of the grain boundary;

the two-grain intergranular boundary further comprises a new phase with the chemical composition of $R_x(Fe+Co)_{100-x-y-z}Cu_yM_z$; wherein, R in the $R_x(Fe+Co)_{100-x-y-z}Cu_yM_z$ comprises at least one element selected from Nd, Dy, and Tb; M is at least one element selected from Bi, Sn, Zn, Ga, In, Au, and Pb; x is 42-44; y is 0.2-0.4; z is 0.2-0.45.

2. The neodymium-iron-boron magnet material according to claim 1, wherein, the neodymium-iron-boron magnet material satisfies any one of the following schemes:

scheme 1:

the content of R is 29.5-32.6%; R1 is rare earth element added during smelting;

R2 is rare earth element added during grain boundary diffusion, the content of R2 is 0.2%-0.9%;

the content of M is 0.35% or less, but not 0, M is at least one element selected from group consisting of Ga, Bi, and Zn;

the content of Cu is 0.05-0.15%;

the content of B is 0.97-1.05%;

the content of Fe is 65-69.5%;

the area proportion of the grain boundary triangle region is 1.98-2.78%;

the continuity of the two-grain intergranular boundary is 97% or more;

the mass proportion of C and O in the grain boundary triangle region is 0.41-0.49%, the mass proportion of C and O in the two-grain intergranular boundary is 0.32-0.41%;

in the new phase with the chemical composition of $R_x(Fe+Co)_{100-x-y-z}Cu_yM_z$; wherein, R in the $R_x(Fe+Co)_{100-x-y-z}Cu_yM_z$ comprises at least one element selected from Nd, Dy and Tb; M is at least one element selected from group consisting of Ga, Bi, and Zn; x is 42-44; y is 0.2-0.4; z is 0.2-0.45; the ratio of the area of the new phase in the two-grain intergranular boundary to total area of the two-grain intergranular boundary is 0.24-2.2%;

scheme 2:

the content of R is 29.5-30.5; R1 is rare earth element added during smelting;

R2 is rare earth element added during grain boundary diffusion, the content of R2 is 0.2%-0.8%;

the content of Co is 0.1%-0.4%;

the content of M is 0.05%-0.35%, M is at least one element selected from group consisting of Ga, Bi, and Zn;

the content of Cu is 0.05-0.08%;

the content of B is 0.99-1.1%;

the content of Fe is 65.5-69%;

the area proportion of the grain boundary triangle region is 1.98-2.62%;

the continuity of grain boundary of the neodymium-iron-boron magnet material is 98% or more;

the mass proportion of C and O in the grain boundary triangle region is 0.41-0.45%, the mass proportion of C and O in the two-grain intergranular boundary is 0.34-0.41%;

in the new phase with the chemical composition of $R_x(Fe+Co)_{100-x-y-z}Cu_yM_z$; wherein, R in the $R_x(Fe+Co)_{100-x-y-z}Cu_yM_z$ comprises at least one element selected from group consisting of Nd, Dy, and Tb; M is at least one element selected from group consisting of Ga, Bi, and Zn; x is 42.33-43.57; y is 0.23-0.35; z is 0.27-0.41; the ratio of the area of the new phase in the two-grain intergranular boundary to total area of the two-grain intergranular boundary is 0.5-2.14%.

3. A magnet steel, which is prepared using the neodymium-iron-boron magnet material according to claim 1.

4. The neodymium-iron-boron magnet material according to claim 1, wherein, x is 42.33-43.57, y is 0.23-0.35, z is 0.27-0.41;

or, the ratio of the area of the new phase in the two-grain intergranular boundary to the total area of the two-grain intergranular boundary is 0.24-2.2%.

5. The neodymium-iron-boron magnet material according to claim 1, wherein, the content of Nd in R1 is 28.5-32.5%;

or, R1 further comprises at least one element selected from the group consisting of Pr, Ho, Tb, Gd, and Y;

or, R2 further comprises at least one element selected from the group consisting of Pr and Dy;

or, Cu has been added to the material during smelting or during grain boundary diffusion.

6. The neodymium-iron-boron magnet material according to claim 5, wherein, when R2 comprises Pr, the content of Pr is 0.2% or less, but not 0;

or, when R2 comprises Dy, the content of Dy is 0.3% or less, but not 0.

7. The neodymium-iron-boron magnet material according to claim 1, wherein, M is at least one element selected from the group consisting of Zn, Ga, and Bi;

or, the neodymium-iron-boron magnet material further comprises Al.

8. The neodymium-iron-boron magnet material according to claim 7, wherein, the content of Al is 0.3% or less, but not 0.

9. A preparation method for the neodymium-iron-boron magnet material according to claim 1, which employs a raw material composition; the preparation method comprises the following steps: elements other than R2 in the raw material composition of neodymium-iron-boron magnet material are subjected to smelting, powdering, forming, sintering to obtain a sinter, and then the mixture of the sinter and R2 is subjected to grain boundary diffusion;

operations of the smelting are that elements other than R2 of the raw material composition of neodymium-iron-boron magnet material are smelted and casted by ingot casting process and strip-casting flake process to obtain alloy sheets;

the raw material composition comprises the following components by mass percentage: R: 28-33%;

R is rare earth element, which comprises R1 and R2;

R1 is rare earth element added during smelting, which comprises Nd and Dy;

R2 is rare earth element added during grain boundary diffusion, which comprises Tb, the content of R2 is 0.2%-1%;

Co: 0.05-0.45%;

M≤0.4%, but not 0, M is at least one element selected from the group consisting of Bi, Sn, Zn, Ga, In, Au, and Pb;

Cu≤0.15%, but not 0;
B: 0.9-1.1%;
Fe: 60-70%;
the percentage is the mass percentage of the mass of each component to the total mass of the raw material composition.

10. The preparation method according to claim 9, wherein, the raw material composition satisfies any one of the following schemes:
scheme 1:
the content of R is 29.5-32.6%;
the content of R2 is 0.2%-0.9%;
the content of Co is 0.05-0.45%;
the content of M is 0.35% or less, but not 0, M is at least one element selected from the group consisting of Ga, Bi, and Zn;
the content of Cu is 0.05-0.15%;
the content of B is 0.97-1.1%;
the content of Fe is 65-69.5%;
scheme 2:
the content of R is 29.5-30.5%;
the content of R2 is 0.2%-0.8%;
the content of Co is 0.1-0.4%;
the content of M is 0.05-0.35%, M is at least one element selected from the group consisting of Ga, Bi, and Zn;
the content of Cu is 0.05-0.08%;
the content of B is 0.99-1.1%;
the content of Fe is 65.5-69%.

11. The preparation method according to claim 9, wherein, in the raw material composition,
the content of Nd in R1 of the raw material composition is 28.5-32.5%;
or, the content of Dy in R1 is 0.3% or less, but not 0;
or, R1 further comprises one or more of Pr, Ho, Tb, Gd, and Y;
or, R2 further comprises at least one element selected from the group consisting of Pr and Dy;
or, the way of adding Cu comprises adding Cu during smelting or adding Cu during grain boundary diffusion.

12. The preparation method according to claim 9, wherein, in the raw material composition,
M is at least one element selected from the group consisting of Zn, Ga, and Bi;
or, the raw material composition further comprises Al.

13. The preparation method according to claim 12, wherein, in the raw material composition,
the content of Al is 0.3% or less, but not 0.

14. The preparation method according to claim 9, wherein, after the grain boundary diffusion, the low temperature tempering treatment is further performed.

15. The preparation method according to claim 14, wherein, the temperature of the smelting is 1300-1700° C.;
the powdering process comprises hydrogen decrepitation powdering and jet milling powdering; the hydrogen decrepitation powdering comprises hydrogen absorption, dehydrogenation and cooling treatment; the temperature of the hydrogen absorption is 20-200° C., the temperature of the dehydrogenation is 400-650° C., the pressure of the hydrogen absorption is 50-600 kPa; the jet milling powdering is performed under the condition of 0.1-2 MPa, the time of the jet milling powdering is 2-4 h;
the temperature of the sintering is 1000-1200° C.;
the time of the sintering is 0.5-10 h;
the temperature of the grain boundary diffusion is 800-1000° C.;
the time of the grain boundary diffusion is 5-20 h;
the temperature of the low temperature tempering treatment is 460-560° C.; and,
the time of the low temperature tempering treatment is 1-3 h.

* * * * *